United States Patent
Steffl et al.

(12)

(10) Patent No.: US 6,361,870 B1
(45) Date of Patent: Mar. 26, 2002

(54) COATING MATERIAL CONTAINING PERFLUORE POLY ETHER STRUCTURE

(76) Inventors: Rudolf Steffl, Sonnenmulde34, 87466, Oy-Mittelberg (DE); Reiner Kasemann, Niedermaierstr.17, 85625 Glonn (DE); Wolfgang Burger, 707 Pine Ridge La., Valley View Hockessin, DE (US) 19707

( * ) Notice: Subject to any disclaimer, the term of this patent is extended or adjusted under 35 U.S.C. 154(b) by 0 days.

(21) Appl. No.: 09/462,397

(22) PCT Filed: Jul. 14, 1998

(86) PCT No.: PCT/EP98/04376

§ 371 Date: Mar. 27, 2000

§ 102(e) Date: Mar. 27, 2000

(87) PCT Pub. No.: WO97/01508

PCT Pub. Date: Jan. 16, 1997

(30) Foreign Application Priority Data

Jul. 15, 1997 (DE) .............................................. 9730245

(51) Int. Cl.⁷ ........................... B32B 9/04; G08G 77/24; G07F 7/12
(52) U.S. Cl. ...................... 428/447; 428/451; 427/387; 106/287.12; 106/287.13; 106/287.14; 106/287.16; 106/287.17; 106/287.19; 528/10; 528/36; 528/42; 556/445; 556/482; 556/485; 556/488
(58) Field of Search .............................. 528/10, 36, 42; 106/287.12, 287.13, 287.14, 287.16, 287.17, 287.19; 556/445, 482, 485, 488; 427/387; 428/447, 451

(56) References Cited

U.S. PATENT DOCUMENTS

| 5,180,845 A | | 1/1993 | Higley ........................ 556/445 |
| 5,241,096 A | * | 8/1993 | Kinami et al. ............... 556/442 |
| 5,288,889 A | | 2/1994 | Takago et al. ............... 556/419 |
| 5,550,184 A | | 8/1996 | Halling ........................ 524/837 |
| 5,644,014 A | | 7/1997 | Schmidt et al. ............... 528/43 |

FOREIGN PATENT DOCUMENTS

| EP | 0166 363 | 1/1986 |
| EP | 0707 179 | 4/1996 |
| EP | 0738771 | 10/1996 |
| EP | 0797 111 | 9/1997 |
| WO | WO 92/21729 | 12/1992 |
| WO | WO/97/01508 | 1/1997 |

* cited by examiner

*Primary Examiner*—Robert Dawson
*Assistant Examiner*—Jeffrey B. Robertson
(74) *Attorney, Agent, or Firm*—CArol A. Lewis White

(57) ABSTRACT

The invention relates to a coating material comprising condensates of at least one compound (A) of the general formula $R_aMZ_b$ (a=0–3; b=1–4; a+b=3, 4), where R is a non-hydrolyzable organic group, and at least one compound (B) of the general formula $R'xMZ_y$ (x=1–3; y=1–3; x+y=3, 4), where R is a non-hydrolyzable organic group and at least one R' contains a perfluoro polyether structure separated from M by at least two atoms, where M is an element from the periodic table of elements selected from the main groups III–V or from the subgroups II–IV and Z is a hydrolyzable organic group, and where at least one R is not equal to at least one R'.

17 Claims, 1 Drawing Sheet

COATING MATERIAL CONTAINING PERFLUORE POLY ETHER STRUCTURE

FIELD OF THE INVENTION

The invention concerns a coating material based on modified polysilsesquioxanes (highly crosslinked materials, for example, with the empirical formula $RSiO_{1.5}$), their synthesis and use of the coating material to coat surfaces, especially porous polymers, to achieve oleophobic properties with high temperature stability. The invention also concerns a material coated with this coating material and its applications, as well as an aeration and deaeration element.

BACKGROUND OF THE INVENTION

Polymer surfaces typically have hydrophobic, but not oleophobic, properties and are wettable for liquids with low surface tension (solvents). Even microporous polytetrafluoroethylene (PTFE) with known high hydrophobic and oleophobic properties is wettable by liquids with surface tensions <28 mN/m (cf. EP 0,581,168).

Numerous fluorine-containing coating compositions for oleophobizing of polymer or porous surfaces are already known, which, however, leave room for improvement, especially in degree of olephobism, temperature stability and oleophobism at elevated temperature.

Coatings based on fluorinated alkyl (meth)acrylates for coating of polyolefins (PP,PE) are described in EP 0,581,168 (Mitsubishi).

Oleophobic coating of microporous (ePTFE) Teflon AF is described in EP 0,561,875.

WO 92/21715 describes the use of perfluoropolyether as oil-repellent coating for microporous polymers. Silicon alkoxides with perfluoropolyether side chains for dirt-repellent coating of silicone surfaces are described in Japanese Application JP 4-213384.

Coating materials based on mixtures of alkoxysilanes, alkoxysilanes with organic nonhydrolyzable side groups and silanes with perfluorinated side groups, which carry perfluorinated groups enriched on the air surface after crosslinking, are described in EP 0 587 667. R. Kasemann et al., New J. Chem., 1994, 18 page 1117, describes such functional coatings produced via the sol-gel process.

Only a method for production of a gel from an inorganic oxide is know from WO 97/01508, in which at least one fluorinated inorganic oxide precursor is mixed with a fluorinated acid. Addition of a fluorinated solvent is absolutely essential. These are cost-intensive and environmentally relevant. It is also disclosed that a layer of material produced in this way is used as an "adhesion aid" for a fluoropolymer layer. Possible use of the coating for oleophobization is not described. WO 97/01599 describes a composition from a fluoropolymer and an inorganic oxide produced as described in WO 97/01508.

The task according to the invention consists of preparing a coating material having high oleophobism.

Another task is to apply a coating material to substrate surfaces, especially porous polymers, in which the coated substrate exhibits high oleophobism.

Another task is to produce a coated substrate with high oleophobism, having high temperature stability.

A further task is to produce a coated substrate, in which only a slight change in permeability of the substrate develops from the coating or the porosity is essentially uninfluenced, in the case of porous substrates.

A next task is to produce such a coating material without having to use environmentally relevant, especially fluorinated, solvents.

A last task is to devise an aeration and deaeration element that has versatile use and prevents entry or passage of liquids.

SUMMARY OF THE INVENTION

The coating material according to the invention comprises condensates of at least one compound A with general formula $R_aMZ_b$ (a=0–3; b=1–4; a+b=3–4), in which R is a nonhydrolyzable organic group, and at least one compound B of the general formula $R'_xMZ_y$ (x=1–3; y=1–3; x+y=3–4), in which R' is a nonhydrolyzable organic group and at least one R' contains a perfluoropolyether structure separated from M by at least two atoms, in which M is an element chosen from groups IIIA–VA or groups IIB–IVB of the periodic system and Z is a hydrolyzable organic group, and in which at least one R is not identical to at least one R'.

The coating material according to the invention can be applied to a 35 substrate. In a preferred variant the substrate is a porous polymer, especially a textile fabric or a fluoropolymer or fluoropolymer blend, especially in microporous form, like expanded polytetrafluoroethylene (ePTFE).

The invention also offers a process for production of a coating material, in which at least one compound A of the general formula $R_aMZ_b$ (a=0–3; b=1–4; a+b=3–4), in which R is a nonhydrolyzable organic group, and at least one compound B of the general formula $R'_xMZ_y$(x=1–3; y=1–3;x+y=3–4), in which R' is a nonhydrolyzable organic group, and at least one R' contains a perfluoropolyether structure separated from M by at least two atoms, in which M is an element chosen from groups IIIA–VA or groups IIB–IVB of the periodic system and Z is a hydrolyzable organic group, and in which at least one R is not identical to at least one R', are mixed.

The invention also makes available a process for coating of a substrate, in which a coating material according to the invention is applied to a substrate and cured. The present invention also creates an aeration and deaeration element that comprises a coated material, having a substrate and a coating material applied to at least one surface of the substrate, in which the coating material contains condensates of a least one compound A of general formula $R_aMZ_b$ (a=0–3; b=1–4; a+b=3,4), in which R is a nonhydrolyzable organic group, and at least one compound B of the general formula $R'_xMZ_y$ (x=1–3; y=1–3; x+y=3,4), in which R' is a nonhydrolyzable organic group, and at least one R' contains a perfluoropolyether structure separated from M by at least two atoms, in which M is an element chosen from groups IIIA–VA or groups IIB–IVB of the periodic system and Z is a hydrolyzable organic group, and in which at least one R is not identical to at least one R'.

DETAILED DESCRIPTION

Figure 1:
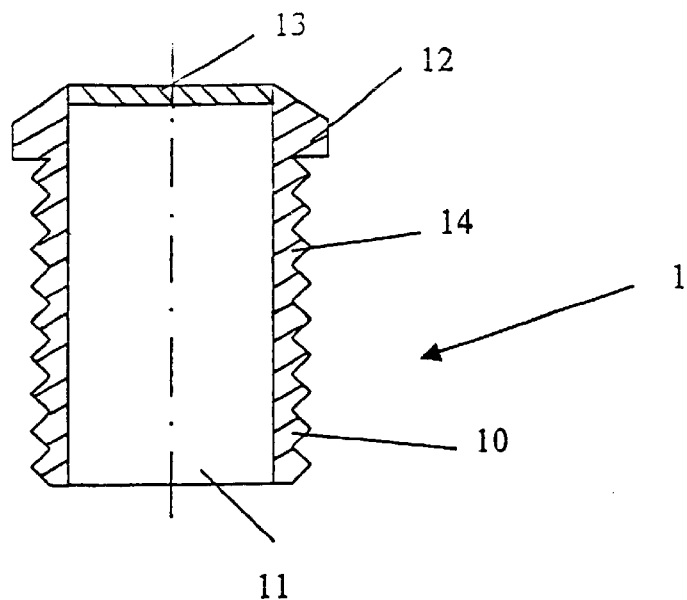
FIG. 1 shows a schematic section of an aeration and deaeration element in the form of a screw.

"Condensate" means an oligomer or polymer possessing at least one metal-oxygen metal bond, which usually forms by condensation of two OH groups bonded to metal atoms.

A "nonhydrolyzable organic group" is understood to mean any organic group bonded to a metal atom, in which no hydrolytic cleavage of the bond between the metal and organic group occurs in the reaction medium (for example, Si—C bond).

A "hydrolyzable group" is any group bonded to a metal atom M, which an form M—O—H groups by reaction with water, optionally catalyzed by acids or bases.

A "perfluoropolyether structure" means a polyfluoroxyalkylene group, in which poly- or perfluorinated groups are generally bonded via at least one oxygen bridge.

A "membrane" is a porous film, according to this application.

"Porous" denotes a structure having joined pores or cavities, which are configured so that continuous passages or paths through the material are formed.

"Surface" of the substrate means both the outer and inner surface, if present. Inner surface means the walls of the pores of cavities of a porous substrate.

The inventors found, for the first time, that coating materials that solve the task of the invention can be made accessible by hydrolysis and condensation of a mixture of at least two compounds, namely, at least one metal compound with hydrolyzable groups, and at least one metal compound with at least one nonhydrolyzable organic group, in which at least one nonhydrolyzable group must contain a perfluoropolyether structure.

Such coatings are characterized by very high oleophobism. Oil values of the coating and the coated substrate of >3, especially >5 and preferably >7, can then be achieved. The very high oleophobism can be explained by the fact that the perfluoropolyether chains enriched on the layer surface are extremely ordered (for example, crystalline), owing to the effect of the underlying matrix formed from highly crosslinked polycondensates.

It is important that at least two of the mentioned compounds, i.e., a compound A and a compound B, are present. If only one compound is chosen, these high oil values cannot be achieved.

The oil values of the coated substrate are also dependent on the surface porosity of the substrate.

The coatings also exhibit high oleophobism at high temperatures and are temperature-resistant. Thus, the oil value of the coated substrate, after heat treatment at 160° C., lasts for 12 hours, at 200° C. for 2 hours and especially at 250° C. for 2 hours. Transmission fluid (ATF Oil, Autran DXII, BP Hamburg) does not wet the structure for 12 hours, up to 200° C. This means, in particular, that the wetting angle of a drop of transmission fluid on the coating and subsequent heat treatment at 160° C. for 12 hours is $\geq 10°$.

Preferred examples of the metal atom M are Al, B, Ge, Sn, Ti, Zr and especially Si.

Examples of hydrolyzable groups Z in the educts (monomeric compounds or also oligomeric or polymeric precondensates, optionally with different M atoms) are halogens and especially OR"groups, in which R" is an organic group, for example, alkyl groups, especially with 1–5 carbon atoms (methyl, ethyl, etc.), carbonyl-functionalized groups, like C=OCH$_3$ or C=OCH$_2$CH$_3$, aryl compounds, like phenyl, alkoxy-functionalized alkanes, like alkylmethoxy or alkylethoxy compounds. Organic groups R" that form alcohols with boiling points <200° C., especially <100° C. during hydrolysis, are particularly preferred, since removal of the volatile hydrolysis products is possible in simple fashion because of this. Instead of hydrolyzable OR" groups, other groups can also be used (for example, halogen), which form MOH groups by hydrolysis. Such groups, however, are not particularly preferred, since the hydrolysis products formed in parallel (acids, salts) generally cannot be removed simply from the layer.

Examples of nonhydrolyzable groups R or R', in which one or more different R or R' can be bonded to metal-atom M, are the following nonfluorine containing groups: alkenyl (especially $C_2$–$C_4$ alkenyl), alkynyl ($C_2$–$C_4$), acryl, methacryl, aryl (especially $C_6$–$C_{10}$) and especially alkyl groups $C_1$–$C_5$, for example, methyl, ethyl, propyl, isopropyl).

Oligomeric or polymeric precondensates, optionally with different M atoms and R or R' groups, can also be used, in addition to monomeric compounds of the general formula $R_aMZ_b$ or $R'_xMZ_y$.

Examples of fluorine-containing, nonhydrolyzable groups R, R' are compounds carrying a perfluoropolyether side chain with the general formula:

$(R_p\text{-}X\text{-})_a MR_{mb} Z_{ci}$ (a+b+c=3, 4; a=1–3; b=0, 1,2), in which $R_m$ is a nonhydrolyzable organic group. M=Si and/or Z=OR" is particularly preferred.

$R_p$ stands for a perfluoropolyether structure, for example, $CF_3CF_2CF_2[OCF(CF_3)CF_2]_xOCF(CF_3)(CF_2CF_2)_y$—(x and y $\geq 0$, preferably x=1–10) or $CF_3[OCF(CF_3)CF_2]_d(OCF_2)_e$—(d and e $\geq 0$, preferably d=1–10).

The perfluoropolyether structure then contains preferably 6–100 fluorine atoms.

X describes a group that separates Rp from Si by at least two atoms, for example,
—CH$_2$COOCH$_2$CH(OH)CH$_2$, COO, SO$_2$NH, CONH, COOCH$_2$CH(OH)(CH$_2$)$_z$(z=2–4).

(z=2–4), COO(CH$_2$), (z=2–4),
SO$_2$NH(CH$_2$)(z=2–4), CONH—(CH$_2$)$_z$(z=2–4).

Examples of hydrolyzable groups Z and nonhydrolyzable groups $R_m$ for components carrying $R_p$ groups are identical to those described above for RMZ or R'MZ compounds.

A preferred compound A is Si(OR")$_4$, a particularly preferred compound A is RSi(OR")$_3$, in which R is a nonhydrolyzable organic group and R" is a $C_1$–$C_5$ alkyl.

In compound B a preferred compound is R'Si(OR)$_3$, in which R' is a nonhydrolyzable organic group. A particularly preferred compound B consists of $CF_3[OCF(CF_3)CF_2]_d(OCF_2)_eOCONHCH_2CH_2CH_2Si(OR)_3$ (d and e >0, preferably d=1–10).

The molar ratio of the groups R:R' especially lies between 0.1:100 and 100:0.1.

Suspensions of metal oxide particles, for example, the elements Ti, Zr, Al, Si, can also be added as additional components. Particle sizes of <1 $\mu$m are preferred, especially <100 nm (for example, silica sols (SiO$_2$) of the Bayer Company). Such components are incorporated into the inorganic network via the surface OH groups by condensation reactions and can improve the mechanical properties of the layers.

The coating material is preferably produced by the sol-gel process. The sol-gel process is defined as a process in which colloidally dispersed dissolved particles (sols) are produced by condensation, starting from molecules that carry hydrolyzable groups. The condensation reactions in such sols generally do not run completely. Sols are liquid intermediates that can be used as a coating material. After the coating step and complete buildup of the structure formed by condensation, in which additional crosslinking mechanisms can optionally be used (for example, polymerization of organic functional groups), the pores present in the structure at this point are filled with solvents (gel). After the solvent is driven off (for example, by heat, vacuum), the material that remains as coating on the substrate is formed.

The aforementioned educts are therefore mixed and hydrolyzed to produce the coating composition. In the simplest case, hydrolysis of the mixture can occur at ambient temperature and pressure without addition of further additives and without additional physical treatment.

However, water is preferably added to the educts (preferably >0.5 mol per mol of Z groups) or relatively limited amounts of acids or bases for catalysis. The preferred concentration of acids and/or bases is >0.1 mmol per liter of mixture, especially >0.1 mmol and <10 mol per liter of mixture. Examples are inorganic or organic acids or bases, especially ammonia, alkali and alkaline earth hydroxides (NaOH, KOH), amines, formic acid, acetic acid, propionic acid, hydrochloric acid, sulfuric acid, phosphoric acid. Volatile compounds that can easily be driven out from the layer, for example, during the thermally induced curing step, are particularly preferred. Catalyst mixtures can also be used, in which the total catalyst concentration can be up to 10 mol per liter. Agitation is preferred during synthesis, optionally to application of the coating. It is possible to cool the mixture to reduce the reaction rate.

It is generally advantageous, departing from the ordinary state of the art, to conduct hydrolysis in steps, in which the components not carrying $R_p$ groups are prehydrolyzed in one or more steps, for example, by addition of water, and the components carrying the $R_p$ groups are added in the subsequent step. If hydrolysis of the mixture of all components is run in one step, phase separations in the coating composition are frequently observed, which can lead to nonhomogeneous layers.

Appropriate, preferably nonenvironmentally relevant solvents (for example, mono- or polyfunctionalized alcohols ($C_{1-10}$), especially volatile alcohols, like methanol, ethanol, propanol, isopropanol) can be added after or during the hydrolysis step to adjust the appropriate solids content (preferably 0.1–50 wt. %).

When inorganic acids are used as catalysts during synthesis, ion exchangers can be used, in particular, after individual hydrolysis steps or at the end of synthesis, in order to separate ions that can lead to reduction of chemical stability or pot life. In this case, the ion exchanger is ordinarily added in solid form and then separated by filtration. Examples of applicable ion exchangers are anion exchangers or cation exchangers, for example, Dowex 50 W×2, Amberlyst A-21 (Fluka Chemie AG Switzerland).

If water is to used as solvent after the hydrolysis or partial condensation steps, most of the formed volatile components can be separated, for example, by distillation. Water is then added, in which a suspension is formed, to which surfactants can then optionally be added to reduce the surface tension or for improved wetting. A homogeneous coating, even on the inner surface of the substrate, is made possible by wetting of a microporous substrate.

Essentially all materials can be used as substrate for coating, for example, metal, glass or polymers, especially porous polymers. Polymers appropriate as substrate include fluoropolymers, like polytetrafluoroethylene (PTFE), especially expanded PTFE (ePTFE), microporous stretched PTFE, as described in U.S. Pat. Nos. 3,953,556 and 4,187,390; stretched PTFE provided with hydrophilic impregnation agents and/or layers, as described in U.S. Pat. No. 4,194,041; polyolefins, like polyethylene or polypropylene; polyamides; polyesters; polycarbonates; polyurethanes; elastomers, like copolyether-esters; and similar compounds, as well as polymer blends.

The substrate can be present in different forms, for example, as membranes or film, as a sealant or as a textile fabric. Textile fabrics are generally understood to mean meshes, knits, wovens or nonwovens. The substrate can also be a laminate, in which at least one layer is formed from a membrane or film and at least one layer consists of a textile fabric. The layers can be joined to each other, for example, in the form of gluing, sealing or lamination. If the substrate is present in the form of a laminate or a film, this can also be bonded to a textile fabric after treatment with the coating.

Homogeneous, thin coatings are obtained after application of the coating material by ordinary coating techniques onto the surface of the substrate and preferably heat-induced crosslinking and driving off of the volatile components (water, alcohols formed or added during hydrolysis). In the case of porous structures, a homogeneous, very thin (in the nanometer to micrometer range) coating of the inner surface must be achieved, so as not to significantly reduce the porosity or pore size, i.e., for example, to avoid film formation or filling of the pores, which would lead to a significant reduction in permeability. The thickness of the coating is then naturally dependent on the application amount, i.e., a reduction of permeability is generally observed with increasing application amount. The permeability is preferably only slightly influenced by the coating, i.e. the permeability is reduced, at most, 40%, preferably, at most, 20% in comparison with the uncoated substrate.

To produce polar surface groups on the substrate, especially OH groups, the substrate can be pretreated, for example, by corona or plasma pretreatment, in order to permit chemical bonding of the coating material by condensation of the surface OH groups with OH groups of the sol components.

All known coating methods for application of liquid media can be used, for example, spraying, dipping, doctoring, screen printing, especially roll coating techniques. The concentration, solids content of the solution and/or pressure or temperature can then be varied. Adjustment of the solids content of the coating material and thus regulation of the thickness of the coating in the process according to the invention is possible, for example, by varying the added amount of solvent (for example, isopropanol, ethanol) during or after synthesis.

The coated substrate can be cured in conjunction with the coating step. This can occur, for example, by heat treatment, IR radiation or vacuum. For example, the coating can be cured for 0.1–60 minutes at 50° C.–250° C., preferably 120° C.–180° C. This type of treatment can also be conducted to evaporate the solvent.

The coated material according to the invention, which can have a porous substrate, for example, in the form of films, membranes or laminates, can find numerous applications because of the high permeability, temperature resistance and oleophobism, for example, as a filter medium. This coated material according to the invention is also particularly suited for use in aeration and deaeration elements, since the coated material can simultaneously prevent entry and passage of liquid media because of its properties. Examples of such applications include pressure equalization elements for electronic housings, sensors, lights, liquid containers, especially in technical or automotive applications.

The coating material according to the invention can serve in nonporous substrates as an antisoiling or antiadhesion agent because of its properties.

The aeration and deaeration element according to the invention, which incorporates a material coated according to the invention as described, is generally designed in the form so that an opening of the container being aerated and deaerated is covered with a substrate coated according to the invention. Joining of the substrate coated according to the invention (membrane, laminate) with the edge of the opening of the container can occur in any form or joining technique that permits liquid-tight joining. Examples of joining techniques include clamping, gluing, injection molding. The coated substrate according to the invention is preferably joined to the edge of the opening of the container being aerated and deaerated by means of a selfadhesive film. Another preferred variant preferably has a frame that possesses at least one air inlet and outlet opening, and the air inlet and outlet opening is covered by the coated material. The frame has the function of permitting a simple joining technique to the container being aerated and deaerated, for example, screwing, locking of snapon closures, etc.

The shape and material of the frame that carries the coated material or is joined to this material can be varied in numerous ways.

Depending on the area of application, the frame can consist of metal, ceramic, plastic (especially polypropylene [PP] or polyethylene [PE]).

The shape and size of the frame depends on the recess or opening of the container being aerated or deaerated in which the element is to be used. The frame of the aeration and deaeration element according to the invention can have the shape of a ring or sleeve. The aeration and deaeration element according to the invention preferably has the shape of a screw with an axial through-hole, in which the through-hole is completely covered with the coated material in the region of the screw head.

The coated material can be joined to the frame in different ways. For example, in a two-part frame consisting of two rings it can be attached between these rings by clamping. The coated material is preferably glued to the frame. In this case, the coated material is provided with a glue layer and, during production of the frame, is fastened to it.

Preferred variants of the aeration and deaeration element are described with reference to the accompanying figures.

Figure 3:
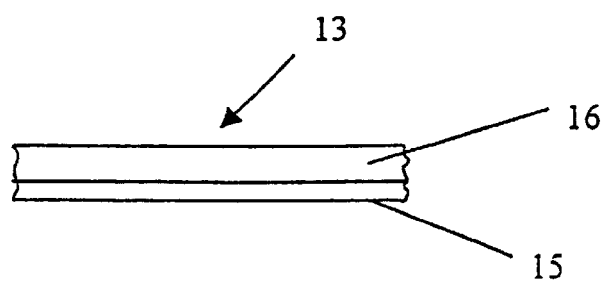
FIG. 3 shows a section through the coated material 13 in an aeration and deaeration element according to the invention.

In the figures:

An aeration and deaeration element 1 is shown in FIG. 1, whose frame 10 has the shape of a screw with an axial through-hole 11. The through-hole 11 is covered by the coated material 13 in the region of screw head 12. The coated material 13 preferably consists in this variant of a substrate in the form of a membrane 15, for example, from ePTFE, or a laminate from a layer of membrane 15 and a layer of textile woven fabric 16 (see FIG. 3). This substrate is covered with the coating material according to the invention. The aeration and deaeration element can be easily screwed into a recess, for example, a hole, in a housing with the threading 14 provided on the outside of frame 10.

Figure 2:
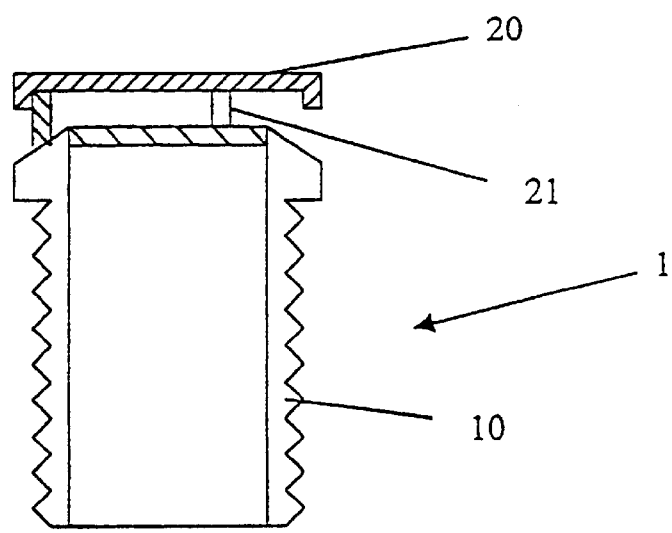
FIG. 2 shows a schematic section of an aeration and deaeration element in the form of a screw with cover.

The position of the coated material in the frame can be arranged according to the application and manufacturing process on the upper end of the screw head 12 or at a certain depth of the throughhole 11. Another variant of the aeration and deaeration element 1 is shown in FIG. 2, in which a cover 20 is provided, in addition to the variant described in FIG. 1. This cover 20 is connected by external force to sleeve 10 via fastening elements 21; for example, claws, which are arranged at a spacing around the periphery of the screw head. A spacing, through which air intake and removal can occur, is provided between the upper end of sleeve 10 and the lower end of cover 20.

The aeration and deaeration element according to the invention has excellent and thermal stability because of the properties of the employed coated material, in which the coated material possesses oleophobism, even at high temperatures. The aeration and deaeration element according to the invention can thus be used as a pressure equalization element for closure caps, in which emergence of liquids from the container is avoided and sufficient aeration and deaeration of the container is simultaneously guaranteed.

Oil Repellency

The oil value is determined according to AATCC 118-1983 (American National Standard).

In this case, drops of 8 defined liquids with defined surface tensions (diminishing from liquid 1 to 8) are applied at room temperature to the surface.

The oil value determination occurs by determining which liquid (1–8) does not is wet the surface or structure within 30 seconds. The higher the liquid number (oil value), the higher the oil repellency (oleophobism).

A film of material can be produced to measure the oil value of the coating material by coating an aluminum foil and etching the aluminum with a dilute acid after heat curing of the layer, in order to obtain a film of material. In the case of nonporous surfaces, unwetted is defined by the fact that the advancing wetting angle for the corresponding liquid is $\geq 50°$.

Permeability

The apparatus of Coulter Electronics Limited, Luton, England, type Porometer II was used to determine permeability. The penetrating air amount in liters per minute and $cm^2$ is determined at a defined pressure (1 bar).

Wetting Angle

A goniometer microscope (Kruss GmbH, Hamburg, type G40) is used to measure the wetting angle. The wetting angle of a drop applied to the coated surface is optically measured at room temperature.

Pore Size Determination

The apparatus of Coulter Electronics Limited, Luton, England, type Porometer II was used to determine pore size. The apparatus automatically measures pore size distribution in porous materials by defined driving off of liquids, described in ASTM Standard F3 16–86 (American National Standard). The nominal pore size is the average pore size.

The invention will be further explained below with reference to examples. It goes without saying that all other coating components and substrates corresponding to the instructions of the invention are also applicable.

EXAMPLES

Examples 1 and 2 describe the synthesis of the coating material according to the invention, coating of a substrate with such a coating material and the properties of the coated substrate. Both coated substrates have an oil value of 7.

Examples 3 and 4 describe coated materials according to the invention, in which laminates are used as substrate. In Comparative Example 1, alkoxides with perfluorinated n-alkanes were used, according to the instructions of EP-PS 0 587 557, instead of the perfluoropolyethers functionalized with a hydrolyzable group according to the invention. An oil value of only 2 could be achieved with this coating on the same substrate as used in Examples 1 and 2.

For Comparative Example 2 an alkoxy-functionalized perfluoropolyether, as disclosed in JP-OS 4-213384, or also in most of the examples of WO 97/01508, was hydrolyzed and used as only component in the coating material. Here again, an oil value of only 2 was obtained. This shows that the desired high oil values can be achieved only when two components are used. In Comparative Example 3, two components (tetraethoxysilane and $C_8F_{13}CH_2CH_2Si(OC_2H_5)_3$ were used, in principle, corresponding to the instructions of Example 4 of WO 97/01508, to produce the coating. Here again, an oil value of only 2 could be achieved. This again shows that not only the use of at least two components is absolutely essential, but also the specific choice of components according to the invention, in order to achieve high oleophobism. In this example fluorinated solvents were used according to the instructions of WO 97/101508.

Comparative Example 4 corresponds, in principle, to Comparative Example 3, except that, in this case, a mixture of water and isopropanol was used as solvent, as is described as advantageous in the present invention. An oil value of only 2 was also achieved in this case.

EXAMPLE 1

4 g hydrochloric acid (37%) is added during vigorous agitation to a mixture of 357 g methyltriethoxysilane (Huls), 113 g tetraethoxysilane (Hüls) and 200 g silica sol (Bayer Levasil 300/30 [30% $SiO_2$ in water]). The reaction mixture cools off within 2 hours and 1348 g isopropanol is added during agitation. After 14 hours of agitation, 89 g isopropanol and 11.25 g perfluoropolyetherfunctionalized triethoxysilane are added to 100 g of the aforementioned mixture (mixture A).

$(CF_3[OCF(CF_3)CF_2]_d(OCF_2)\ _eOCONHCH_2CH_2CH_2Si(OC_2H_5)_3$, molecular weight 800–900; MF407 from Ausimont).

The coating material is applied by the roll coating technique (coating in the gap between two rolls filled with the coating material) to a microporous polymer membrane described in U.S. Pat. No. 4,194,041 (nominal pore size 0.2 $\mu$m, thickness 0.03 mm). The application amount is essentially obtained by the solids content (here 11%) and by the gap adjustments and pressures of the rolls.

At the end of the coating step, the membrane is treated in a continuous furnace at 150° C. and a residence time of the coated material of 1.5 minutes to evaporate the solvent and for thermal curing of the coating.

The application amount referred to solids is determined by difference weighing at 4.4 g/m².

The oil value on both sides is 7. After holding of the membrane at 160° C. for 12 hours, at 200° C. for 2 hours and at 250° C. for 2 hours, the oil value is determined. In all measurements, the oil value is unchanged at 7. The permeability of the coated membrane is 4.8 L/min per cm². After application of a drop of ATF oil to the coated surface and subsequent holding at 160° C. for 12 hours, the wetting angle of the drop is >10°.

EXAMPLE 2

85 g of MF407 is added during agitation to a mixture of 22.6 g tetraethoxysilane and 20 g isopropanol. 6.3 g of 0.1 M HCl is then added and agitated overnight. The material is diluted in a 1:4 ratio (parts by weight) with isopropanol for coating.

The subsequent process is similar to Example 1. The uncoated membrane then has a permeability of 4.4 L/min per cm².

The application amount referred to solids is determined at 6.8 g/m².

The oil value is 7 on both sides. The permeability of the coated membrane is 3.0 L/min per cm².

After application of a drop of ATF oil to the coated surface and subsequent holding at 160° C. for 12 hours, the wetting angle of the drop is >10°.

EXAMPLE 3

Coating material, coating technique and curing similar to Example 1. A laminate (basis weight 95±10 g/m², thickness 0.1 mm) made of ePTFE, described in U.S. Pat. No. 4,194,041 (nominal pore size 0.5 $\mu$m), and a nylon taffeta textile is used as substrate.

The application amount referred to solids is determined by difference weighing at 5 g/m².

The oil value is 7 on both the ePTFE and nylon taffeta surface. The permeability of the coated membrane is 0.6 L/min per cm² at a pressure of 0.1 bar and is therefore unchanged in comparison with the uncoated laminate.

After application of a drop of ATF oil to the coated ePTFE surface and subsequent holding at 160° C. for 12 hours, the oil does not penetrate the porous structure, i.e., the wetting angle of the drop is >10°.

EXAMPLE 4

Coating material, coating technique and curing are similar to Example 1. A laminate (basis weight 99±10 g/m², thickness 0.1 mm) from ePTFE, described in U.S. Pat. No. 4,194,041 (nominal pore size 0.9 $\mu$m), and a polyester textile (nonwoven) are used as substrate.

The oil value is 6–7 on both the ePTFE and polyester surface. The permeability of the coated membrane is 1.7 L/min per cm² at a pressure of 0.1 bar and is therefore changed no more than 20% relative to the uncoated substrate. After application of drop of ATF oil to the coated ePTFE surface and subsequent holding at 160° C. for 12 hours, the oil does not penetrate the porous structure; i.e., the wetting angle of the drop is >10°.

Comparative Example 1

The procedure of Example 1 is followed, but 14 g of $C_6F_{13}CH_2CH_2Si(OC_2H_5)$ (ABCR Company), as well as 188 g isopropanol, are added to 100 g of mixture A instead of MF407.

The rest of the procedure is similar to Example 1. The uncoated membrane has a permeability of 4.4 L/min per cm².

The application amount referred to solids is determined at 2 g/min².

The oil value on both sides is 2. The permeability of the coated membrane is 3 L/min per cm².

Comparative Example 2

15 g MF407 is diluted with 185 g isopropanol and mixed during agitation with 0.95 g 0.1 M HCl and agitated overnight.

The rest of the procedure is similar to Example 1. The uncoated membrane has a permeability of 4.2 L/min per cm².

The application amount referred to solids is determined at 2 g/min².

The oil value is 2 on both sides. The permeability of the coated membrane is 3.0 L/min per cm².

Comparative Example 3

5 g tetraethoxysilane, 5 g $C_6F_{13}CH_2CH_2Si(OC_2H_5)_3$ and 50 g FC 75 (perfluoronaphthyl tetrahydrofuran, available under the tradename Fluorinert FC 75, $PCR_p$ Inc., Gainesville, Fla.) are mixed and added during agitation to 14.9 g hifluoroacetic acid and agitated for 3 hours.

75.9 g of FC 75 is then added and ePTFE is then coated by roll coating in similar fashion to Example 1. Curing occurs for 30 minutes at 150° C. The oil value is 2. The application amount is 10 g/m² The permeability is determined at 1.2 L/min per cm².

Comparative Example 4

208.8 g tetraethoxysilane and 200 g isopropanol are mixed during agitation with 27 g 0.1 N HCl. After 17 hours of agitation, 12.5 g of $C_6F_{13}CH_2CH_2Si(OC_2H_5)_3$ and 75 g isopropanol are added to 10 g of the reaction mixture. ePTFE is then coated by roll coating in similar fashion to Example 1. Curing occurs for 30 minutes at 140° C. The oil value is 2. The application amount is 3.5 g/m². The permeability is determined at 3.7 L/min per cm².

What is claimed is:

1. Coated material, comprising: a porous polymer-substrate and a coating material applied to at least one surface of the substrate, which material comprises condensates of at least one compound A of the general formula $R_aMZ_b$ (a=0–3; b=1–4; a+b=3–4), in which R is a nonhydrolyzable organic group, and at least one compound B of the general formula $R'_xMZ_y$ (x=1–3; y=1–3; x+y=3–4), in which R' is a nonhydrolyzable organic group, and at least one R' contains a perfluoropolyether structure separated from M by at least two atoms, in which M is an element chosen from groups IIIA–VA or groups IIB–IVB of the periodic system and Z is a hydrolyzable organic group, and in which at least one R is not identical to at least one R'.

2. Coated material according to claim 1, in which the polymer is chosen from a group consisting of at least one fluoropolymer.

3. Coated material according to claim 2, in which the polymer is expanded polytetrafluoroethylene (ePTFE).

4. Coated material according to claim 1, in which the substrate is present in the form of a membrane, a sealant or textile fabric.

5. Coated material according to claims 1, in which the substrate is present in the form of laminate, consisting of at least one layer of a membrane and at least one layer of a textile fabric.

6. Coated material according to claim 1, in which the substrate is a membrane bonded to a textile fabric.

7. Coated material according to claim 1 with an oil value ≧3.

8. Coated material according to claim 1 with an oil value ≧5.

9. Coated material according to claim 1 with an oil value ≧7.

10. Coated material according to claims 1, in which the oil value of the coated substrate remains unchanged after heat treatment at 160° C. for 12 hours.

11. Coated material according to claim 1, in which the oil value of the coated substrate remains unchanged after heat treatment at 200° C. for 2 hours.

12. Coated material according to claim 1, in which the oil value of the coated substrate remains unchanged after heat treatment at 250° C. for 2 hours.

13. Coated material according to claim 1, in which the wetting angle of a drop of transmission fluid (ATF oil) on the coating is >10° after heat treatment at 160° C. for 12 hours.

14. Process for production of a coating material that comprises mixing of at least one compound A of general formula $R_aMZ_b$ (a=0–3; b=1–4; a+b=3–4), in which R is a nonhydrolyzable organic group, and at least one compound B of the formula $CF_3[OCF(CF_3)CF_2]_d(COCF_2]_d(OCF_2)_eOCONHCH_2CH_2CH_2Si(OR)_3$ (d and e ≧0, and d=1–10), in which M is an element chosen from groups IIIA–VA or groups IIB–IVB of the periodic system and Z is OR" in which R" is an organic group.

15. Coating material, which comprises a condensate of at least one compound A of general formula $R_aMZ_b$ (a=0–3, b=1–4; a+b=3–4), in which R is a nonhydrolyzable organic group, and at least one compound B of the formula $CF_3[(OCF(CF_3)CF_2]_d(OCF_2)_eOCONHCH_2CH_2CH_2Si(OR)_3$ (d and e ≧0, and d=1–10), in which M is an element chosen from groups IIIA–VA or groups IIB–IVB of the periodic system and z is OR" in which R" is an organic group.

16. Aeration and deaeration element characterized by a frame possessing at least one air inlet and outlet opening, the air inlet and outlet opening being covered by a coating comprising a substrate and a coating material applied to at least one surface of the substrate, in which the coating material comprises condensates of at least one compound A of general formula $R_aMZ_b$ (a=0–3; b=1–4; a+b=3–4), in which R is a nonhydrolyzable organic group, and at least one compound B of the general formula $R'_xMZ_y$ (x=1–3; y=1–3; x+y=3–4), in which R' is a nonhydrolyzable organic group, and at least one R' contains a perfluoropolyether structure separated from M by at least two atoms, in which M is an element chosen from groups IIIA–VA or groups IIB–IVB of the periodic system and Z is a hydrolyzable organic group, and in which at least one R is not identical to at least one R'.

17. Aeration and deaeration element according to claim 16, characterized by the fact that the substrate is porous polymer.

* * * * *